Jan. 16, 1934.  M. J. BROWN  1,943,580

PROCESS FOR CONDUCTING CATALYTIC REACTIONS

Filed July 17, 1929

INVENTOR
Mortimer J. Brown
BY
J. S. Wooster
ATTORNEY

Patented Jan. 16, 1934

1,943,580

UNITED STATES PATENT OFFICE 1,943,580

PROCESS FOR CONDUCTING CATALYTIC REACTIONS

Mortimer J. Brown, Niagara Falls, N. Y., assignor, by mesne assignments, to E. I. du Pont de Nemours and Company, a corporation of Delaware Application July 17, 1929. Serial No. 378,892

2 Claims. (Cl. 23—289)

This invention relates to a new type of apparatus and process for effecting exothermic gas phase catalytic reactions at elevated temperatures.

One of the major difficulties in effecting the successful operation of an exothermic catalytic process is proper temperature control of the catalyst mass. It is usually very difficult to avoid local overheating near the point of initial contact of the fresh gases with the catalyst and this results in shortened life of catalyst and inefficient production.

Practically all of the attempts heretofore made to control the temperature of the catalyst mass within the converter may be grouped in several general classes.

1. The gas or gases to undergo reaction are diluted with another gas such, for example, as the product of the reaction or a gas or mixture inert under the conditions. An obvious limitation is, of course, the decreased rate of production per unit of catalyst mass. Recirculation is often out of the question if the product is subject to further reaction or decomposition and the use of inert diluents generally involves a subsequent separation from the reaction products.

2. In many cases the temperature is moderated by causing the gases to come into initial contact with a restricted mass of catalyst. This means, generally, a high space velocity at the initial contact zone of the gases with the catalyst mass. The arrangement is usually such as will permit cooling of the initial contact zone by radiation or by means of the heat carried away by the gases traveling at high space velocities. With this type of reactor it is very difficult or impossible to avoid a "hot spot" in the catalyst mass at a variable distance from the initial contact zone. The catalyst at this "hot spot" loses its activity prematurely and the gases have to be fed to the catalyst at an ever higher and higher temperature to make up for loss due to radiation until the gases reach the continually advancing "hot spot". Obviously production is limited and the life of the catalyst is shortened.

3. It has been proposed to feed fresh gas through separated, individually controlled inlets at successive regions in the catalyst mass and thus effect temperature control. In general the catalyst will consist of several discontinuous masses. In this case there is a differential space velocity, the greatest velocities being produced in the portion of the catalyst mass to which a partly reacted mixture passes. This method is more or less complicated and quite difficult of practical realization because it is difficult to properly adjust the differential flow within the converter particularly in high pressure converters.

4. Another suggestion involves passing the fresh gases through rather thin layers of catalyst so as to effect great cooling efficiency, both by close proximity of the catalyst layer to outward cooling surfaces and by the speed with which fresh gases are fed through the layer. One of the chief difficulties with this method is that the thin layer is generally not sufficient for a reasonable approach of the reaction to equilibrium and this necessitates additional layers or catalyst masses. This is very uneconomical of space and leads to considerable complication of apparatus.

The object of the present invention is to provide a catalytic apparatus which will make it possible properly to control the temperature of the catalyst mass and thereby equalize the reaction temperature throughout the catalyst mass and at the same time avoid the difficulties inherent in the methods of control heretofore proposed. A further and equally important object is to provide for such efficient temperature control that a maximum conversion results in a given unit of time for a given mass of catalyst and per unit of high pressure converter space. Another object is to increase the effective life of the catalyst.

I have discovered that high rate of conversion, long life of catalyst and automatic temperature control can be effected in the catalytic conversion of gases undergoing reaction accompanied by the liberation of much heat if the fresh gas is allowed to come in contact over an extended portion of the catalyst mass in such a way that fresh gas continually dilutes partially reacted gas in succeeding portions of the catalyst throughout that portion of the catalyst mass which is contiguous to an extended zone of initial contact of gas and catalyst. The fresh gas, therefore, enters the initial contact zone of the catalyst mass substantially at right angles to the flow of the gas undergoing catalysis, and as it enters the reaction zone it cools the partially reacted gas.

The invention may be explained in another way. Fresh gas is fed to the catalyst mass over an extended initial contact zone such that the space velocity of the gas in the direction of flow through the catalyst mass increases progressively from practically zero velocity to practically the maximum velocity which is then maintained substantially constant throughout the remainder of the catalyst mass. This means that the space velocity of the gas making contact with the catalyst is slowest in that part of the catalyst mass in which there is no reaction product to dilute the gas and thus moderate the reaction, and this space velocity becomes progressively greater as the reaction product increases in concentration and moderates the rate of reaction of the fresh gas continuously admixed at right angles to the flow of the reacting gas throughout the zone of initial contact, said zone being substantially parallel to the direction of main flow of reacting gas in the catalyst mass.

The method of contacting fresh gas with catalyst to undergo exothermic reaction over an extended initial contact zone makes it possible to correlate the potential rate of reaction and the capacity of the converter for conducting or conveying heat away from the reaction zone by varying the space velocity of the gas in contact with the catalyst in such a way that the velocity increases as the potential rate of reaction of the gas mixture decreases so that there is no substantial overheating in any part of the catalyst mass.

The invention will now be described with more detail in connection with a specific apparatus as shown in the drawing and applied directly to the conversion of nitrogen and hydrogen into ammonia.

Figure 1:
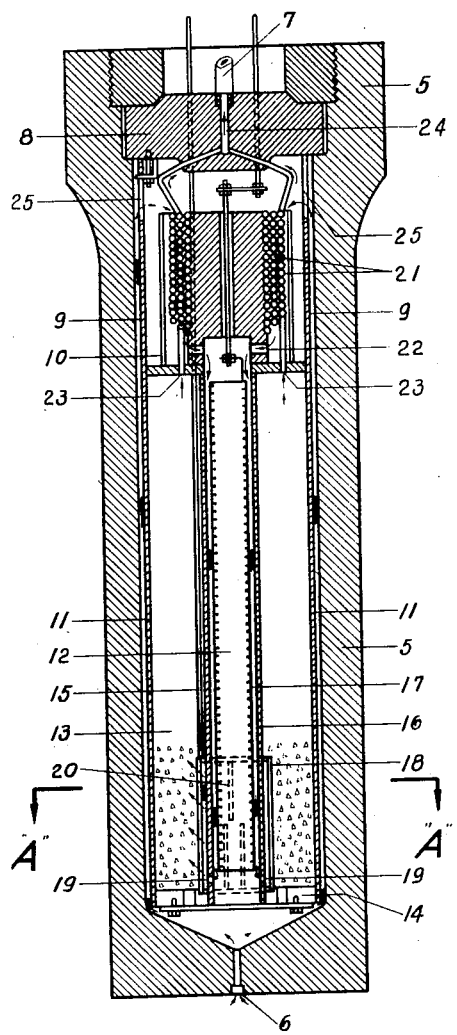
Figure 1 is a longitudinal sectional view of a high pressure converter showing how the initial contact between catalyst and gas is spread over an extended area.
Figure 2:
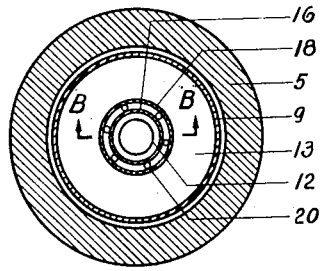
Figure 2 is a horizontal section through the initial gas-catalyst contact zone of Figure 1 at "A—A".
Figure 3:
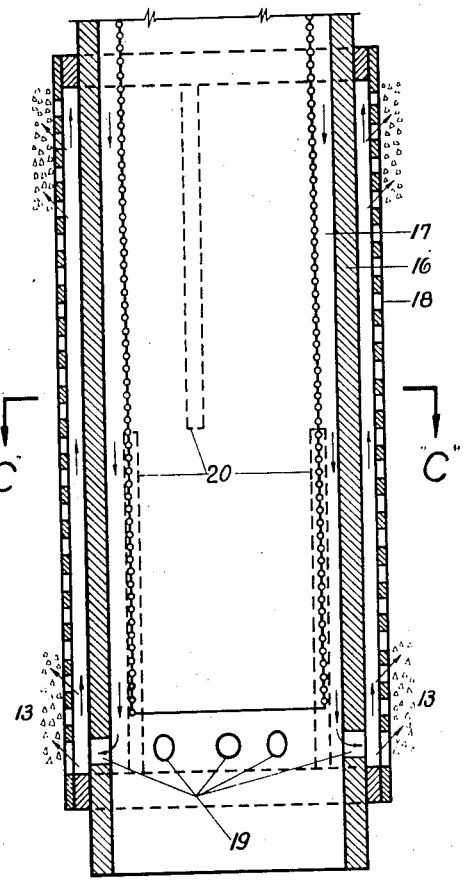
Figure 3 is an enlarged longitudinal sectional view of the initial gas-catalyst contact zone of Figure 1 and corresponds to section "B—B" of Figure 2.
Figure 4:
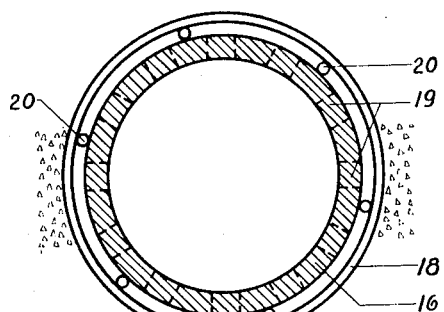
Figure 4 is a horizontal section through Figure 3 at "C—C".

The converter comprises a pressure sustaining vessel 5 provided with an inlet opening 6 for introducing the gas to undergo reaction and an outlet 7 for removing the reacted gas. Suspended within the vessel 5 by attachment to the cover 8 by the concentric cylindrical member 9 are the heat interchange chamber 10, the catalyst chamber 11, formed by the lower section of 9, and the electric heater 12.

The catalyst 13 comprises one continuous annular mass supported on plate 14 which itself is fastened to the cylindrical member 9. The temperature in the catalyst mass may be determined by means of a thermocouple inserted in well 15. In the lower portion of the catalyst chamber there is interposed between the catalyst 13 and the cylindrical sleeve 16, a perforated cylindrical grid or screen 18, which serves to separate the annular heating chamber 17 from the catalyst mass.

The lower end of sleeve 16 is provided with openings 19 to permit gas flow from the heating chamber 17 to the annular space between the sleeve and the grid or screen 18 and thence into the catalyst 13. The outside of the sleeve 16 is provided with separators or spacers 20 over the length of the sleeve opposite the grid or screen 18.

The direction of the flow of gas within the converter is indicated in the drawing by arrows.

In operation the compressed mixture of hydrogen and nitrogen enters the converter at 6 and passes up along the inner wall of the pressure sustaining vessel 5 and the outside of the cylindrical supporting member 9 thus cooling the walls of vessel 5. Near the upper end of the converter the gas then enters the heat interchanger 10 through openings 25 in 9 and absorbs heat by passing over the outside of the coiled spiral tubes 21. Thence, by way of openings 22 the warm gas mixture enters the upper end of the heating chamber 17 where sufficient additional heat if necessary is supplied by electric heating to bring the gas up to a suitable reacting temperature. The heated gas then enters the annular space between the sleeve and the grid or screen 18 through openings 19 in the sleeve 16 of the heating chamber. From this annular space, which acts as a distributing chamber, the gas enters into contact with the catalyst 13, by way of the openings in the grid or through the meshes of the screen. Within the catalyst mass the direction of flow of the gas undergoing catalysis is along the axis of the cylindrical catalyst mass. After traversing the catalyst the reacted gas leaves the catalyst chamber by way of openings 23 which connect directly with the coils 21. The hot reacted gas then passes thru the coils 21 and heats the incoming gas circulating on the outside of the coils. The coils lead to a collector 24 at the top of the converter whence the gas passes from the converter.

The initial contact of the gas with the catalyst is made over the extended annular area which is as long as the screen 18. The spacers 20 serve to establish a proper spacing between the sleeve 16 and the screen or grid 18 so that the gas distributes itself evenly in the space between the grid or screen and the sleeve.

The space velocity of the gas just entering the catalyst mass is much smaller than the overall velocity in the main mass of the catalyst. The space velocity in the catalyst mass adjacent to the screen is practically zero at the bottom and increases up to practically the maximum in the zone of the catalyst immediately adjacent to the upper end of the screen. The screen acts as a distributor of the gas so that along its longitudinal axis fresh gas enters the catalyst in successive increments in such a manner that partially reacted gas successively dilutes fresh gas in succeeding sections of catalyst along the main path of travel of gas in the catalyst mass.

Local overheating of the catalyst near the initial zone of contact of gas and catalyst is thus avoided by making the zone of initial contact surface extend over an appreciable portion of the catalyst mass parallel to the main flow of gas therein.

In general it will always be necessary to make the mass of the catalyst substantially longer in the direction of flow of reacting gas than the initial contact zone. The preferred length of the initial contact zone will be between at least one-tenth to not more than seven-tenths as long as the catalyst mass in the direction of flow of reacting gas therethrough.

It may be advisable to allow a small portion of the fresh gas to enter the catalyst at the bottom end directly in line with the main flow of gas through the catalyst. To secure the effect of the present invention it will, however, be necessary to add the major part of the fresh gas by way of an extended initial contact zone as described above.

Undoubtedly a number of factors combine to make this novel method of contacting gas and catalyst effective in controlling the reaction so that no overheating results and over-all conversion efficiency is greater than with former methods of initially contacting gas and catalyst. The extended initial contact zone extends the area over which the initial reaction heat is produced and thereby avoids the usual "hot spot" that accompanies the restricted initial contact zones of other converters. The decreased space velocity at the points of initial contact allows greater concentration of ammonia in the gas envelope surrounding each active point or particle of the catalyst thus partially moderating the initial reaction, whereas if the initial contact space velocity is very great there is an impinging effect which allows no transient or temporary envelope to build up around the active points on the catalyst, partially to moderate the initial reaction. These factors combined make it possible to utilize to a high degree the maximum conversion capacity of the entire catalyst mass.

Example

A converter similar to the one shown in Figure 1 and having a total high pressure volume of 7.89 cubic feet within the pressure sustaining wall and a mass of approximately 2.56 cubic feet of catalyst occupying a cylindrical space 41 inches long and 4⅛ inches thick (the inside diameter of the cylinder was about 12⅜ inches), when operated with a screen gas distributor 12 inches high and 14½ inches in circumference, or a total initial contact zone area of about 174 square inches, gave an hourly yield of about 400 pounds of ammonia or more and the catalyst retained its effectiveness over several months entirely unimpaired. The catalyst temperature did not vary more than 20° C. from a point 8 inches from the bottom and 2 inches from the top. The pressure of the gas undergoing reaction was approximately 300 atmospheres.

With this may be compared the performance of a converter having the same cubical content and the same size catalyst chamber but no gas distributor. The catalyst chamber was separated into three concentric compartments, the gas entering the inner and smallest compartment at a high space velocity, making contact over an initial contact zone of about 29 square inches. From the inner catalyst compartment the gas then entered the second concentric compartment traveling at reduced space velocity and finally the outer concentric compartment at still further reduced velocity. The cross sectional areas of the three compartments were in the ratio of 11 to 24 to 56. The maximum yield under the most favorable conditions was about 230 pounds of ammonia per hour and the temperature gradient between the concentric compartments was 150 to 200° C. so that at no time was the entire catalyst mass functioning effectively; either the outer compartment was at too low a temperature to produce ammonia or the inner catalyst was at too high a temperature and soon lost its activity. In another case operating with a single annular catalyst chamber the optimum reaction temperature was maintained within a range of about 15° C. in a 24 inch section when a gas distributor was used. Without the distributor the temperature in the same space varied over a range of about 115° C. and there was no sustained zone of optimum temperature.

This method of converting nitrogen and hydrogen is applicable with similar advantageous results to the synthesis of methanol from carbon monoxide and hydrogen. In the case of methanol synthesis it is, of course, necessary to use specific catalysts and to construct certain parts of the converter of non-ferrous metals to avoid decomposing the product. These are specific features, however, which are well known and covered by the general literature and practice of the art and need not be given in detail here.

However, not only is my method of contacting the fresh gas with the catalyst over an extended initial contact zone at reduced initial space velocity applicable to high pressure gas phase syntheses accompanied by liberation of much heat, but also to gas phase exothermic catalytic syntheses at ordinary pressures. As a specific example I wish to point out that this method is applicable to the conversion of methanol and oxygen to formaldehyde. This is a highly exothermic reaction and there is a great tendency to local overheating at the initial contact zone.

I claim:

1. In a process for effecting a vapor phase exothermic catalytic reaction the steps which comprise compressing the gas mixture, thereafter, passing said mixture in heat interchange relation with the hot reacted gases coming from the catalyst, heating said mixture to a reacting temperature by passing it over a heater in a chamber located within the catalyst mass, and thereafter introducing the heated gas into the single catalyst mass substantially at right angle to the flow of the gas undergoing catalysis, said heated gas entering the catalyst mass over an extended zone parallel to the main line of flow of the gas in the catalyst such that over said extended zone unreacted heated gas continually and successively dilutes gas that has undergone partial reaction.

2. Process of effecting vapor phase catalytic reactions which comprises introducing reactant gases into a pressure sustaining bomb, causing said gases to pass in contact with the inner side of the pressure sustaining walls of the bomb, thence passing the gases in heat exchange relationship within the bomb with outgoing gases, passing the partially heated gases over a preheater and causing said preheated gases to enter a single catalyst mass at a plurality of adjacent places distributed along the main line of flow of reacting gases with the catalyst mass.

MORTIMER J. BROWN.